Dec. 15, 1970  H. R. UHTENWOLDT ET AL  3,546,823
GRINDING MACHINE

Filed Oct. 17, 1968  9 Sheets-Sheet 1

INVENTORS
HERBERT R. UHTENWOLDT
RICHARD T. KNORRING
GLENN D. JOHNSON
BY

ATTORNEY

United States Patent Office 3,546,823
Patented Dec. 15, 1970

3,546,823
GRINDING MACHINE
Herbert R. Uhtenwoldt and Richard T. Knorring, Worcester, and Glenn D. Johnson, Sterling, Mass., assignors to The Heald Machine Company, Worcester, Mass., a corporation of Delaware
Filed Oct. 17, 1968, Ser. No. 768,412
Int. Cl. B24b 47/02
U.S. Cl. 51—215                        6 Claims

ABSTRACT OF THE DISCLOSURE

The disclosure relates to a grinding machine and more particularly, to apparatus for moving workpieces automatically from a loading chute to a work station of a grinding machine and then from the work station to an unloading chute where the same are ejected.

BACKGROUND OF THE INVENTION

One of the problems frequently encountered in the design and operation of automatic grinding machines is that of introducing an unfinished workpiece into the work area and removing it after it is finished. Various means have been developed for performing this operation, one of which is shown in the patent of Pollard et al. No. 2,979,870, wherein a mechanism is shown for introducing so-called "miniature" bearing races from a loading chute into the work area and out again after being finished. It has been possible, by use of such loading mechanisms, to speed up the cycles as it relates to very small workpieces, but attempts to speed up the cycle time where medium and large sized workpieces are involved have been unsuccessful, primarily because of the weight and inertia of the workpieces involved. Since the loading portion of the cycle is non-productive, it is, of course, very important that this time be reduced to as small a period as possible. From the point of view of economics, the manufacturer wishes to make optimum use of the capital investment represented by the cost of the the automatic grinding machine. These and other difficulties experienced with the prior art devices have been obviated in a novel manner by the present invention.

It is, therefore, an outstanding object of the invention to provide a grinding machine having a high-speed loading apparatus where the part is always positively moved during the loading cycle, such that there is no reliance on gravity in the loading or unloading portion of the cycle.

Another object of this invention is the provision of a grinding machine having loading apparatus which is relatively simple in construction and, therefore, inexpensive and rugged.

A further object of the present invention is the provision of a loading apparatus for a grinding machine which is adaptable for use with a variety of sizes and shapes of workpiece by the replacement of a few simple parts.

It is another object of the instant invention to provide a grinding machine having a loader which includes relatively simple tooling for adapting it to various sizes of workpieces.

With these and other objects in view, as will be apparent to those skilled in the art, the invention resides in the combination of parts set forth in the specification and covered by the claims appended hereto.

SUMMARY OF THE INVENTION

In general, the present invention relates to a grinding machine having a workpiece with a housing and a rotatable spindle mounted therein to engage and rotate a workpiece for the generation of a surface of revolution whose axis is parallel with the axis of the spindle. A loading chute is provided for presenting successive workpieces to a loading position and a workholder is provided for supporting the workpiece in a grinding position for engagement by the spindle. The apparatus also is provided with an unloading chute having an unloading station in alignment with the loading station. An arm is mounted to swing in a plane perpendicular to the spindle axis and has a workpiece-embracing element, the arm swinging from a first position where the element is aligned with the workpiece in the loading position to a second position where the workpiece is in the grinding position supported by the workholder. The loading position of the loading chute, the workpiece-embracing element of the arm when it is in the said first position, and the unloading station of the unloading chute are all arranged in a line parallel to and spaced from the spindle axis. A plunger is operative in a single stroke along the said line to move a workpiece from the loading position into the workpiece-embracing element of the arm at its first position and, at the same time, to move another workpiece from the element into the unloading position.

More specifically, the workpiece-embracing element consists of a head with a generally circular aperture in which the workpiece fits loosely and with a slot through which a portion of the plunger extends into the aperture to contact the workpiece when the arm is in the said first position. The plunger consists of a fluid cylinder having a piston rod which serves to drive a first plug which is joined by a rod which is parallel to and spaced from the piston rod to a second plug, the plugs being axially spaced, so that the first plug serves to move an unfinished workpiece axially from the loading station into the workpiece-embracing element and the second plug to move a finished workpiece from the element into the unloading station.

BRIEF DESCRIPTION OF THE DRAWINGS

The character of the invention, however, may be best understood by reference to one of its structural forms, as illustrated by the accompanying drawings, in which.

Figure 1:
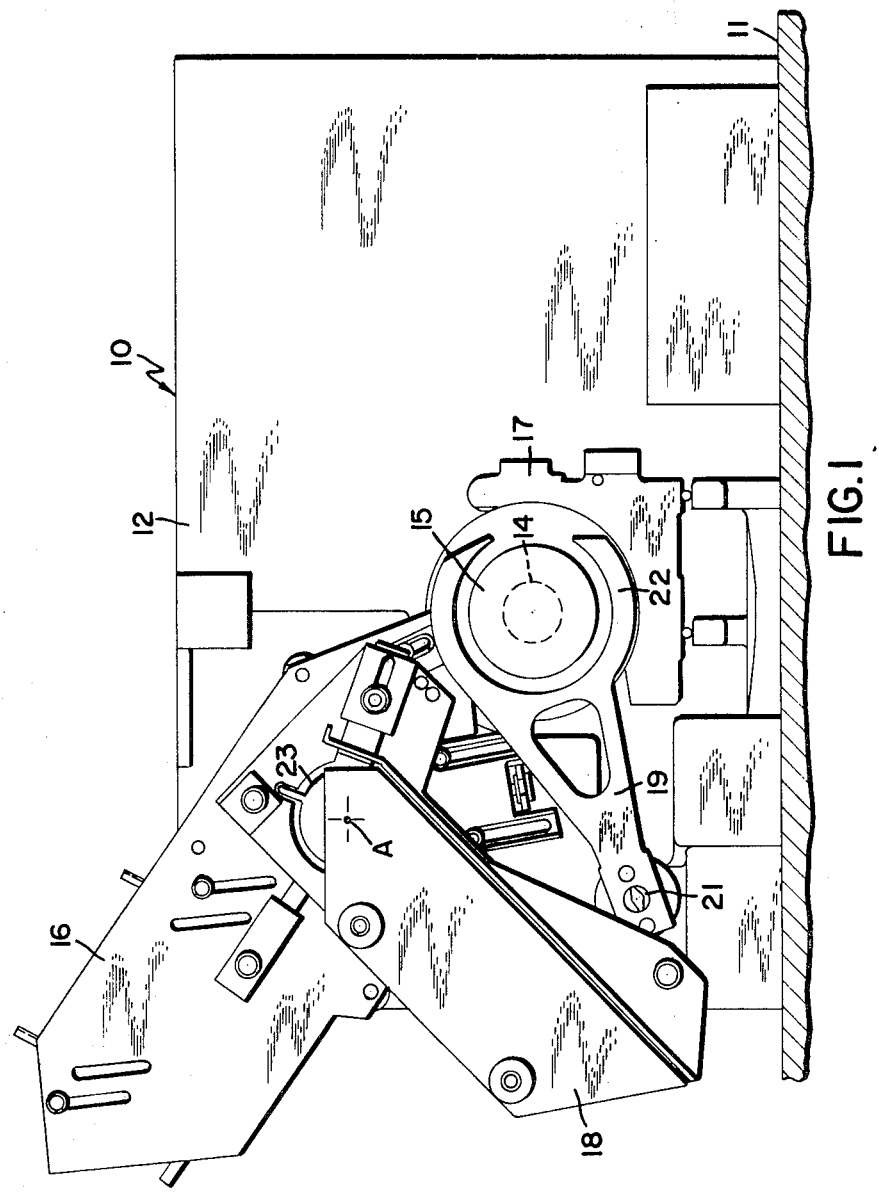
FIG. 1 is a transverse elevational view of a grinding machine embodying the principles of the present invention.
Figure 5:
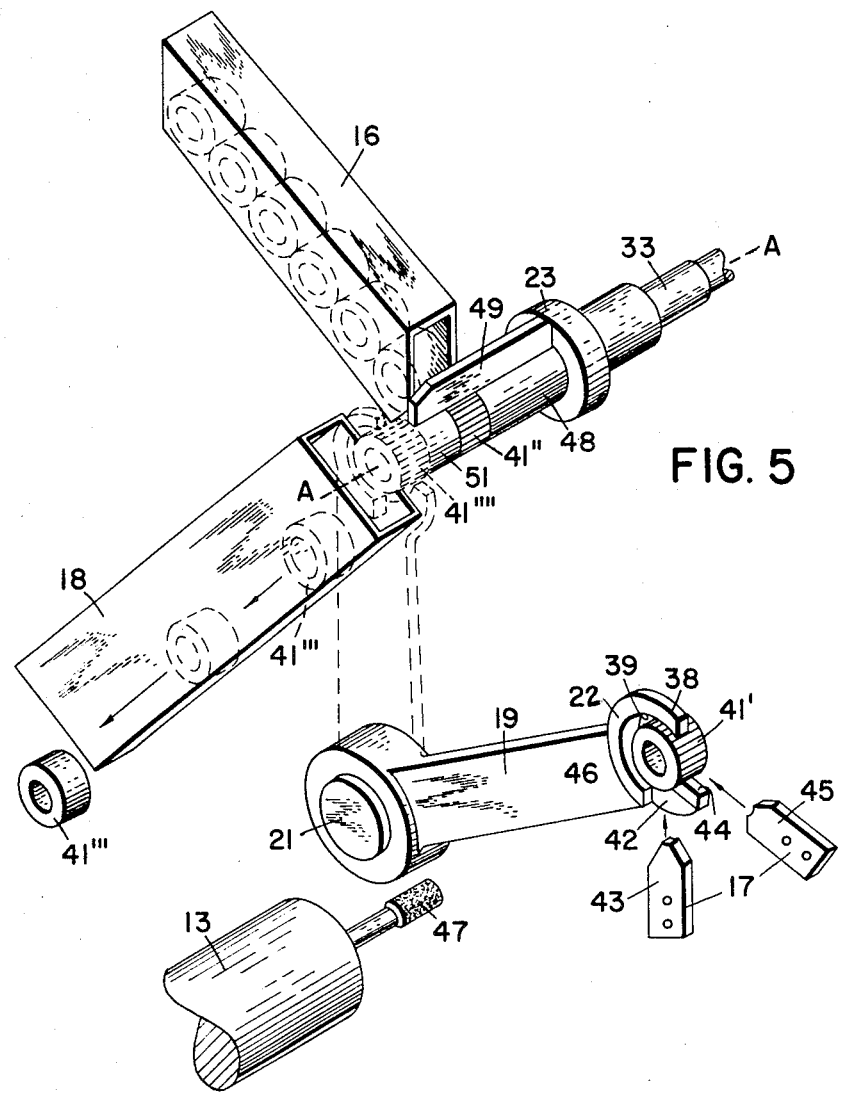
FIG. 5 is a schematic view of the operative elements of the machine in perspective.

Referring first to FIG. 1, wherein are best shown the general features of the invention, the grinding machine, indicated generally by the reference numeral 10, is shown as having a base 11 on which is mounted a workhead 12 and a wheelhead 13 (see FIG. 5). The grinding machine 10 is of the general type shown and described in the patent of Hohler No. 3,197,921; various means not forming part of the present invention are provided for bringing about relative movement between the workhead and the wheelhead to produce a grinding cycle.

Extending from the face of the workhead 12 is a spindle 14 provided with a drive platen 15. Also mounted on the face of the workhead 12 is a loading chute 16 for presenting successive workpieces to a loading position. Mounted on the face of the workhead is a workholder 17 for supporting the workpiece in a grinding position with one end engaging the platen 15. Attached to the loading chute 16 is an unloading chute 18 having an unloading station in alignment with the loading station to receive finished workpieces for disposal.

An arm 19 is mounted on the front of the workhead and is swingable in a plane perpendicular to the axis of the spindle 14. The arm is swingable with a pivot shaft 21 at one end and at the other end is provided with a workpiece-embracing element 22. The arm swings from a first position where the element is aligned with a workpiece in the loading position of the loading chute 16 to a second position where the workpiece is in the grinding position supported by the workholder 17.

The loading position of the loading chute, the workpiece-embracing element of the arm 19 when it is in the said first position, and the unloading station of the unloading chute 18 are all aligned along a line A, which is parallel to and spaced from the axis of the spindle 14. A plunger 23 is operative in a single stroke along the said line A to move a workpiece from the loading position into the workpiece-embracing element of the arm at its first position and, at the same time, to move another workpiece from the element into the unloading position of the unloading chute 18.

Figure 2:
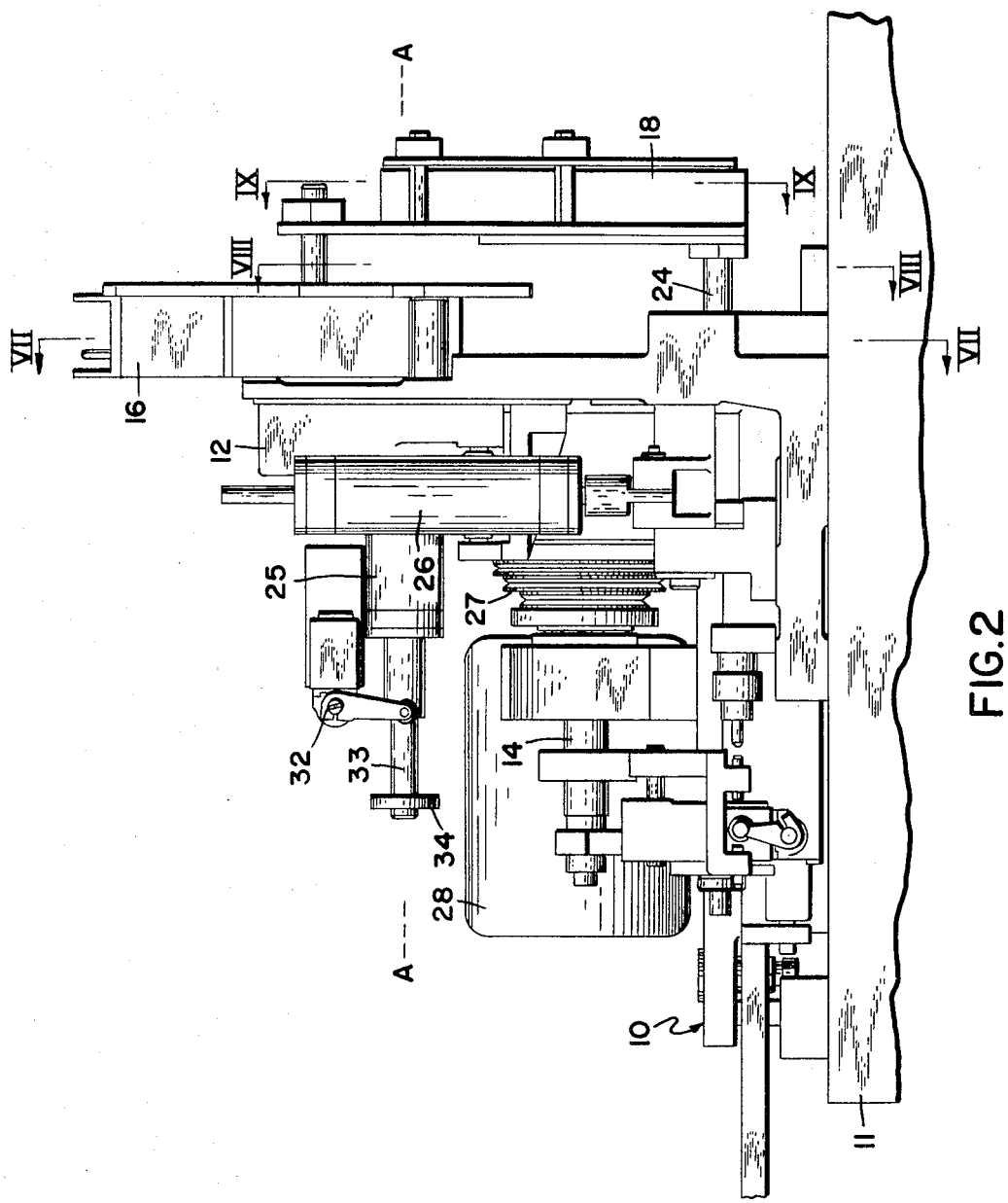
FIG. 2 is a side view of the machine.

FIG. 2 shows the machine as it appears from the operator's side. It shows the way in which the unloading chute 18 is connected to the loading chute 16 by spacing rods 24, thus assuring that the locations of the workpiece in the loading position of the loading chute 16, in the workpiece-embracing element of the arm in the first position of the arm, and the unloading position of the unloading chute 18 are in non-coextensive but adjacent positions. The fluid cylinder 25 is shown for the operation of the plunger 23 and a similar cylinder 26 provided for operating the pivotal shaft 21 of the arm 19. A pulley 27 serves to rotate the spindle 14 and is driven by a motor 28.

Figure 3:
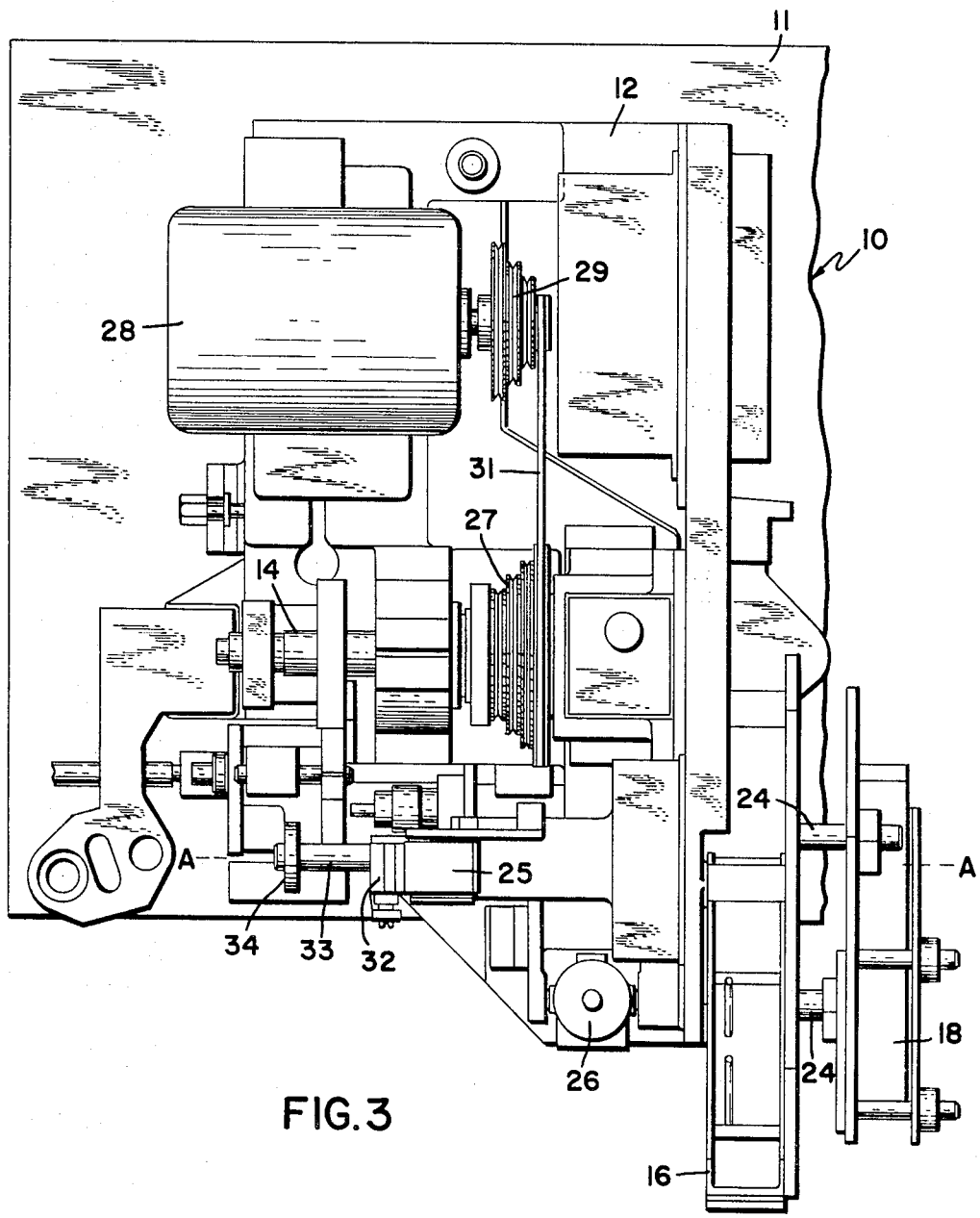
FIG. 3 is a plan view of the machine.

Certain other features of the invention can best be seen in FIG. 3. The motor 28 is provided with a pulley 29 which is connected to the pulley 27 on the spindle by a belt 31. A limit switch 32 is located adjacent the piston rod of the cylinder 25 to indicate the plunger position. The outboard end of the piston rod 33 is provided with a disc 34 adapted to engage the limit switch on occasion.

Figure 4:
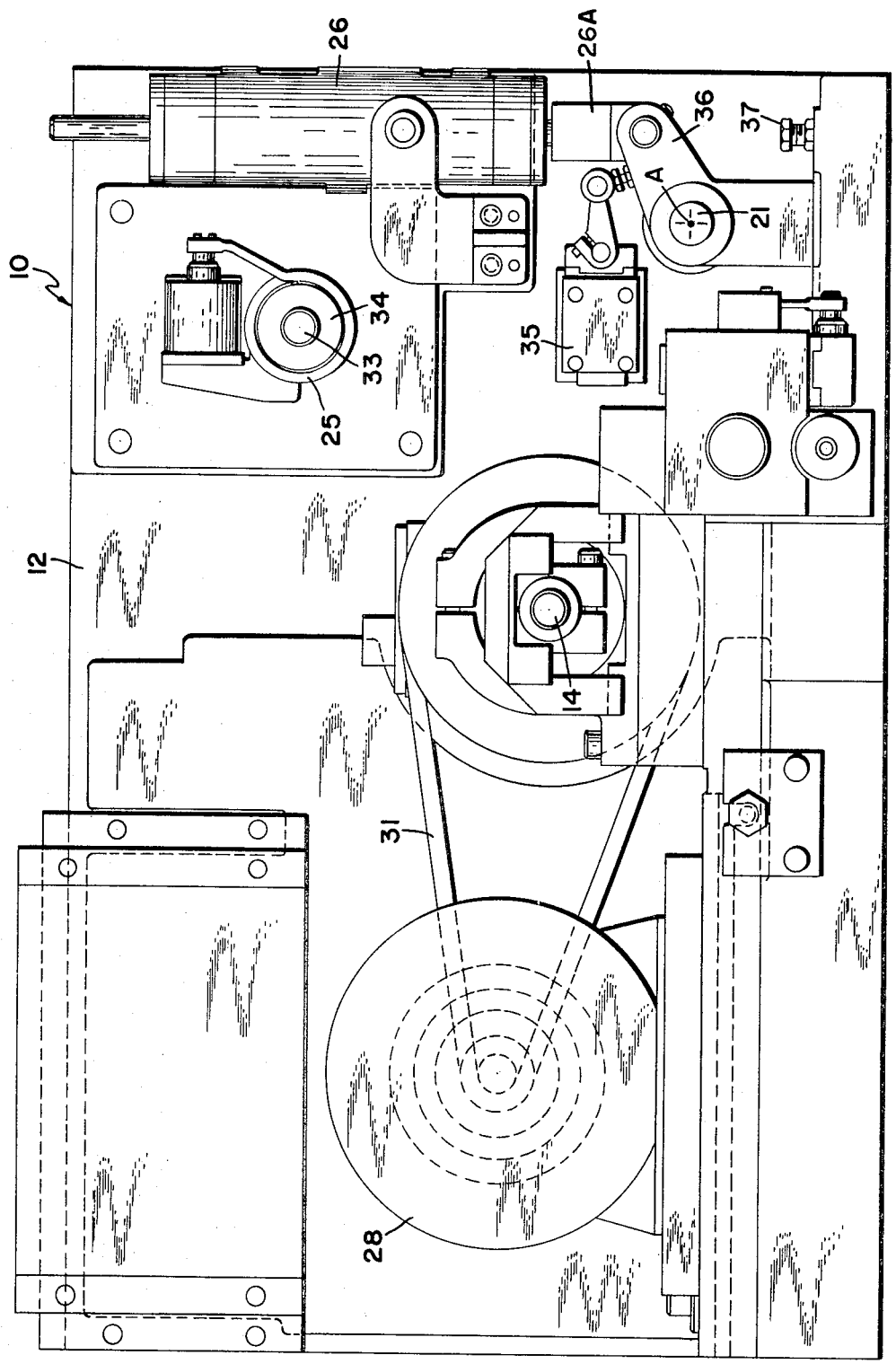
FIG. 4 is a rear end elevational view of the machine.

FIG. 4 shows particularly well the relationship between the axes of the spindle 14, the piston rod 33 (and the axis of the plunger 23), and the pivotal shaft 21 of the arm 19. A limit switch 35 is in position to indicate the position of rotation of the shaft 21 because of its engagement with a suitable stop provided on a crank arm 36 which connects the piston 26A to the shaft 21. An adjustable stop 37 permits the downward motion of the piston 26A and the arm 36.

FIG. 5 shows somewhat schematically the manner in which the apparatus operates in loading and unloading the grinding machine. It is clear that the loading position on the loading chute 16 is located closest to the housing of the workhead. The first position of the arm is next and the unloading position of the unloading chute 18 is outermost. The plunger 23 in performing its function moves along the line A—A from the loading position to the unloading position and the plunger on its return stroke allows a new workpiece to fall from the loading chute into the loading station. The workpiece-embracing element 22 consists of a head 38 with a generally circular aperture 39 extending through it in which the workpiece 41 fits loosely. The head 38 is provided with a groove 42 through which a shoe 43 forming part of the workholder 17 extends into the aperture 39 to contact the workpiece 41 when the arm 19 is in the said second position. The head 38 is also provided with an opening 44 located 90° away from the groove 42 and the shoe 43 to receive another shoe 45 forming part of the workholder 17. The two shoes 43 and 45 serve to support the workpiece out of contact with the surfaces of the aperture when the arm is in the second position. The shoes 43 and 45 constitute the well-known means for supporting the outside surface of the workpiece while an internal bore 46 is being ground by an abrasive wheel 47 associated with the wheelhead 13.

FIG. 5 also shows very well the manner in which the plunger 23 is constructed. The piston rod 33 associated with the cylinder 34 (not shown) is provided with a first plug 48 which is joined by a rod 49 to a second plug 51. These two plugs are coaxial and spaced apart just sufficiently to carry a workpiece 41 and the rod 49 is parallel to and spaced from the axis of the piston rod 33. The first plug 48 serves to move an unfinished workpiece axially along the line A—A from the loading station into the workpiece-embracing element of the arm 22, and the second plug 51 serves to move a finished workpiece from the arm into the unloading station of the unloading chute 18.

In operation, the arm 19 carries a workpiece just ground at position 41' up to the position 41'''. The plunger 23 advances pushing the ground part from position 41'''' into the unload chute 18 at position 41'''. It also pushes a new part to position 41'''' and into the aperture 39 in the workpiece-embracing element 22, as indicated. The arm 19 then swings back downwardly carrying the new part from the position 41'''' to the grinding position 41'. The arm remains in place during the grind, since the shoes 43 and 45 of the workholder 17 hold the workpiece out of contact with the surface of the aperture 39. While this is going on, the plunger 23 retracts allowing a new part to fall from the loading chute 16 into the position 41''.

Figure 6:
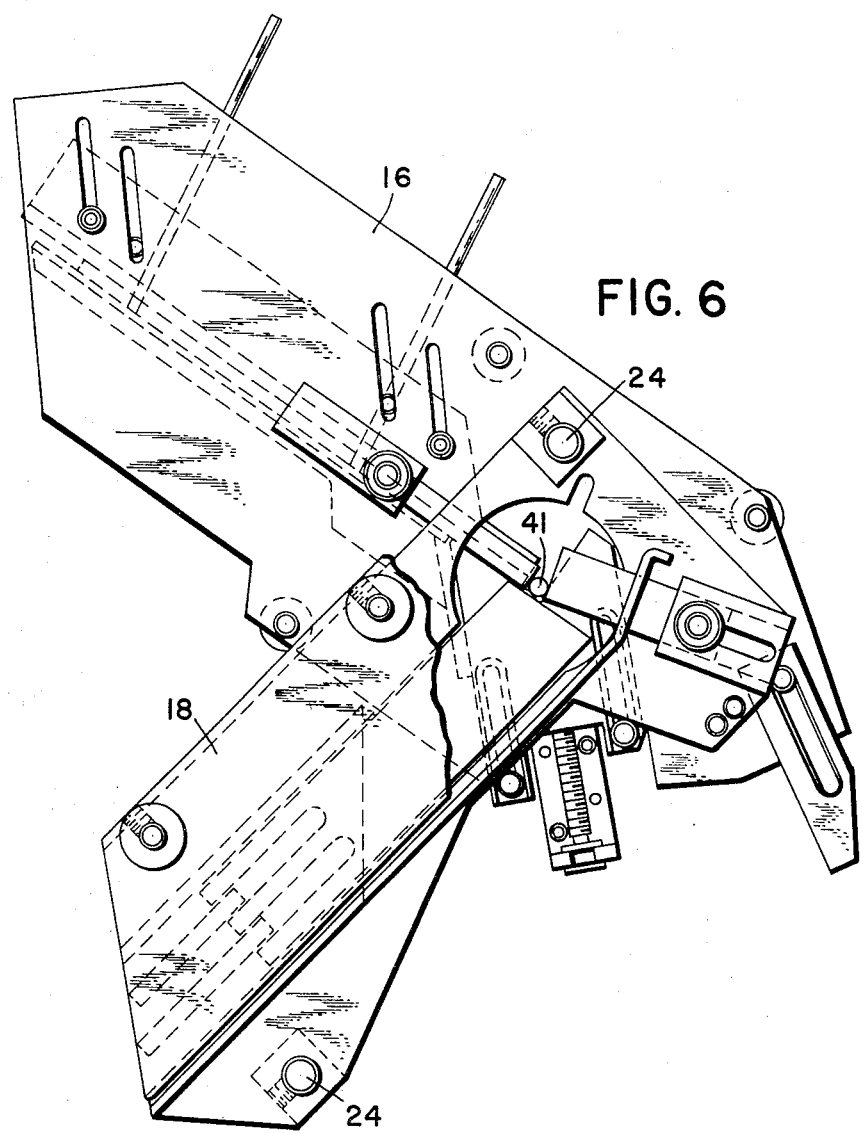
FIG. 6 is an enlarged detailed drawing of a transverse elevation of the machine.
Figure 7:
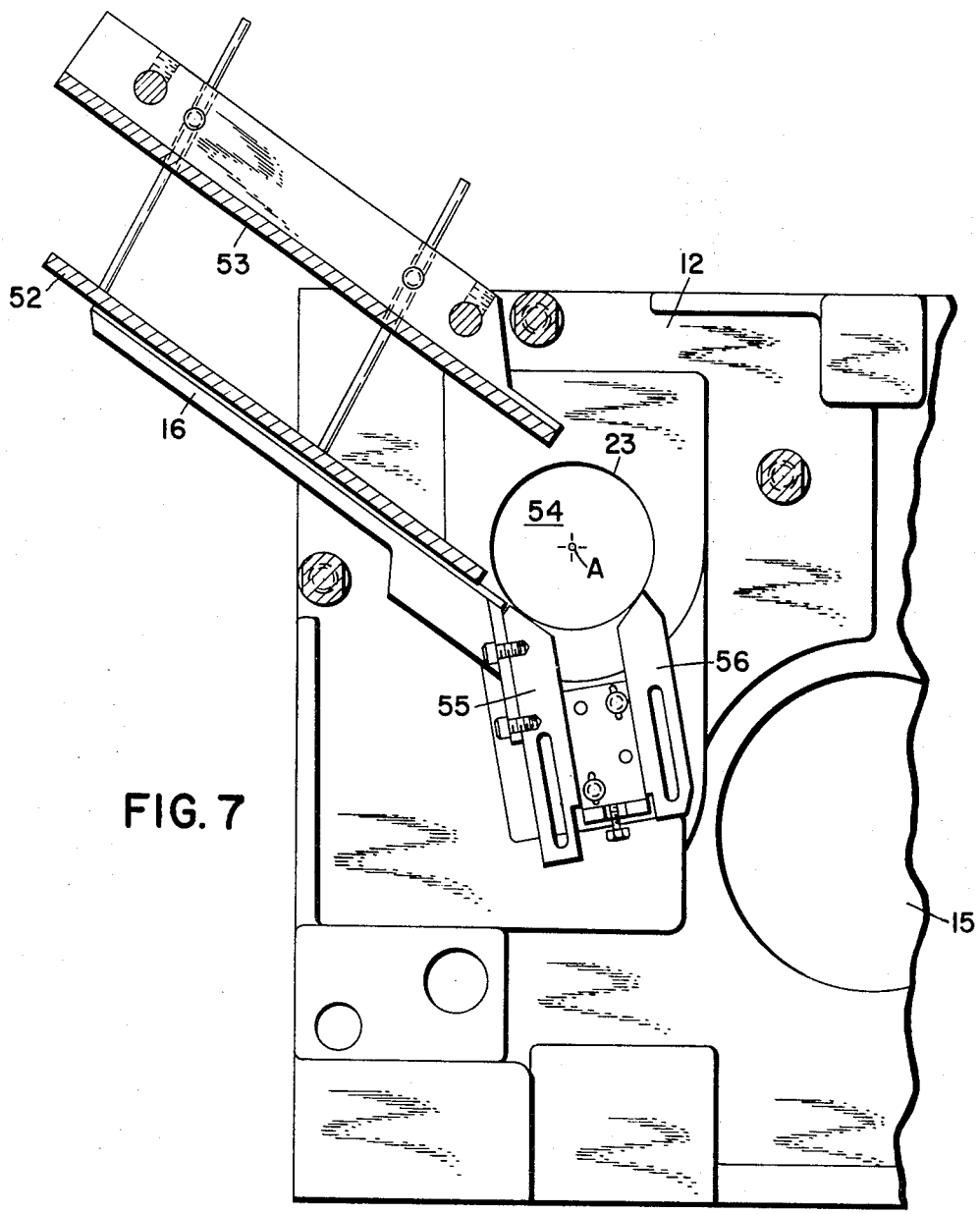
FIG. 7 is a sectional view taken on the line VII—VII of FIG. 2.
Figure 8:
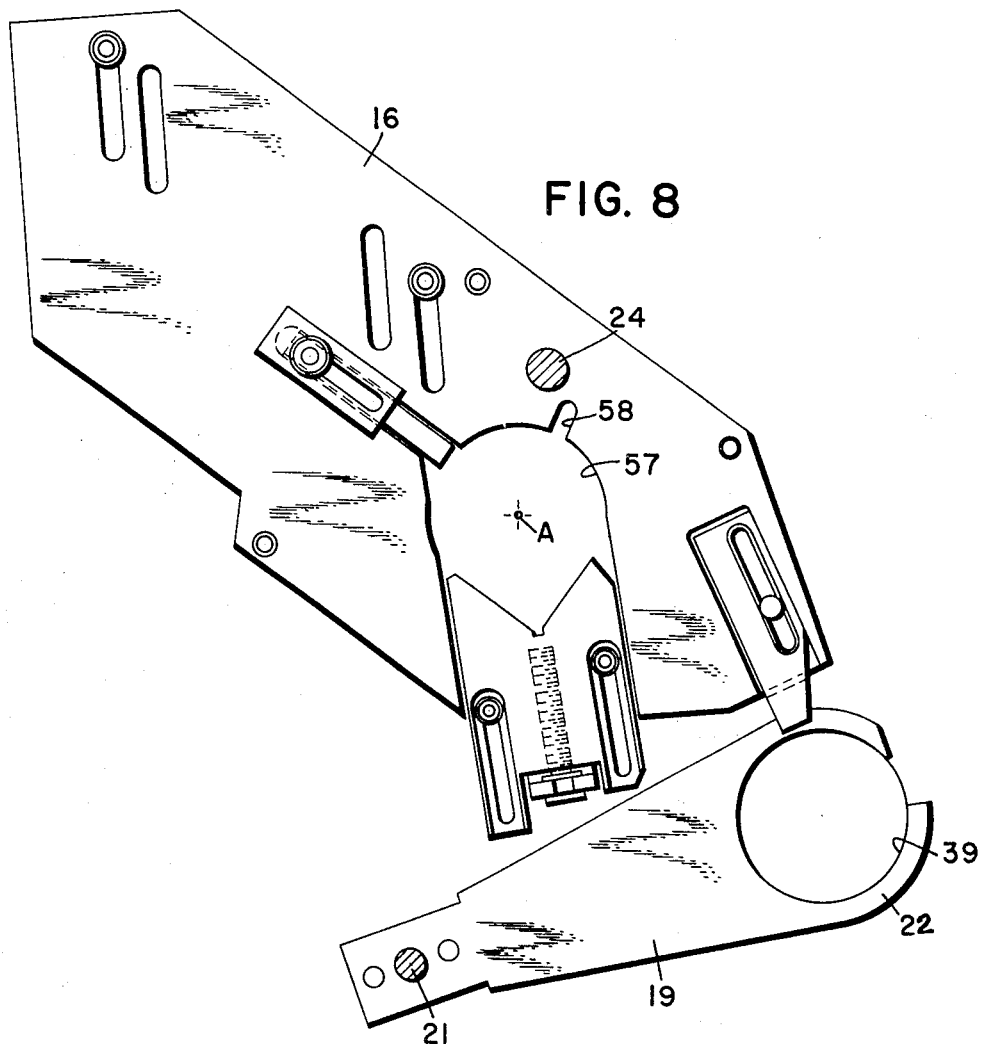
FIG. 8 is a sectional view taken on the line VIII—VIII of FIG. 2.
Figure 9:
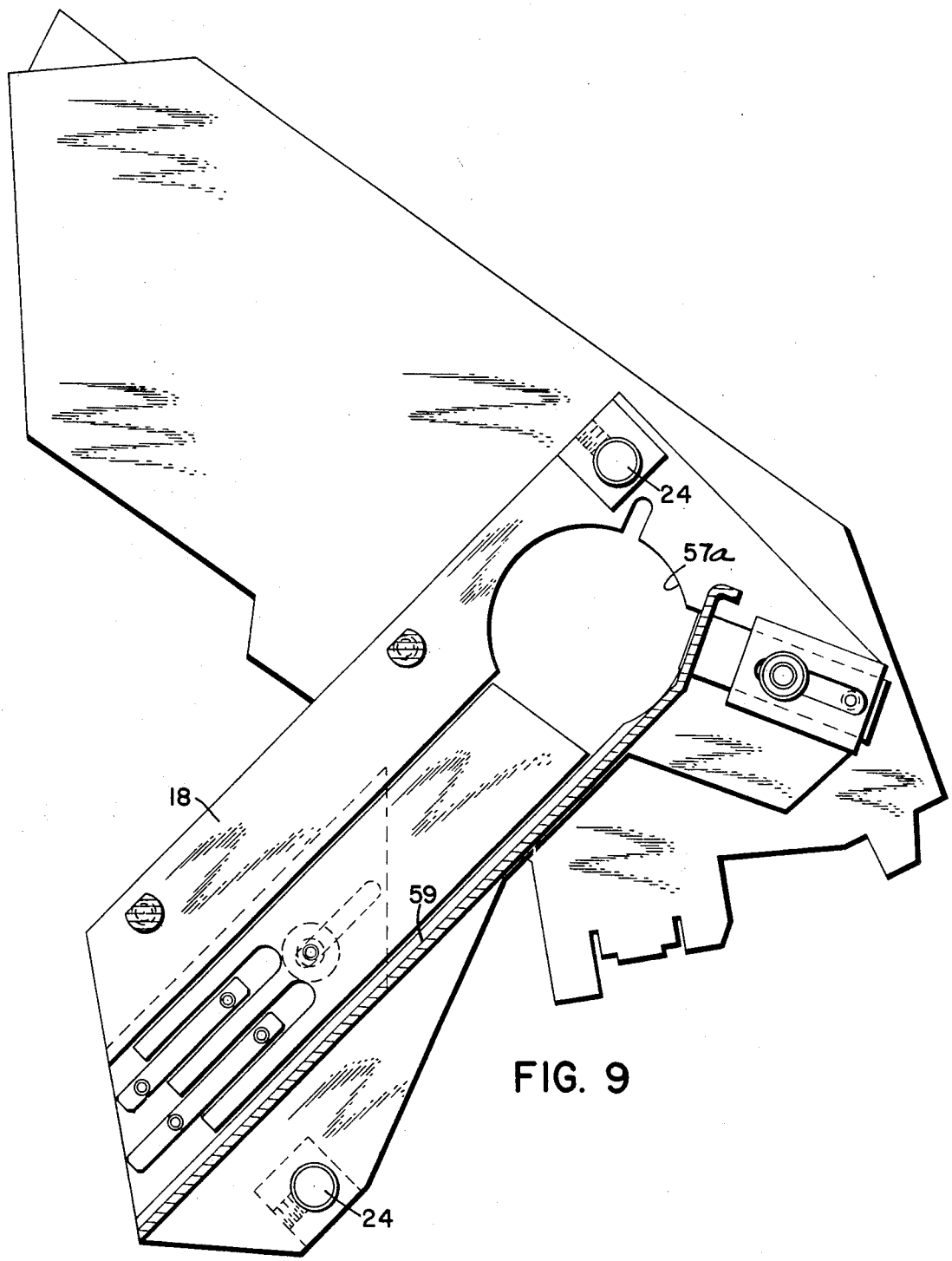
FIG. 9 is a sectional view taken on the line IX—IX of FIG. 2.

FIGS. 6, 7, 8, and 9 show particularly well the details of construction of the chutes and, especially, the ways in which they can be adjusted to handle various sizes of workpieces. FIG. 6 shows the positioning of the elements when a small workpiece 41 is being used, while FIG. 1 had shown the arrangement of the parts when a fairly large workpiece was used. As clearly shown in FIG. 7, the loading chute 16 has an adjustable floor and an adjustable roof 53 as well as a lateral guide 52 and, in FIG. 7, the roof is spaced away from the floor sufficiently to allow rather large workpieces to move downwardly into the loading position 54. This loading position is defined by adjustable fingers 55 and 56, and these fingers serve to hold the workpiece with its axis coaxial with the axis A of the plunger 23. In FIG. 8, it can be seen that the side of the loading chute 16 is provided with a wide aperture 57 to permit the movement of a workpiece axially along the axis A—A into the position 41'''' to be received in the arm 19. The aperture 57 also has a small slot 58 to accommodate the rod 49 when the plunger 23 makes its movement. A similar aperture 51a is formed on the inner wall of the unloading chute 18. It is provided with a floor 59 down which the finished workpieces can roll but, of course, there is no need for a roof.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine, comprising:
   (a) a workhead having a housing and a rotatable spindle mounted therein adapted to engage and rotate a workpiece for the generation of a surface of revolution whose axis is parallel with the axis of the spindle,
   (b) a loading chute for presenting successive workpieces to a loading position,
   (c) a work holder for supporting the workpiece in a grinding position for engagement by the spindle,
   (d) an unloading chute having an unloading station in alignment with the loading station, (e) an arm swingable in a plane perpendicular to the spindle axis having a workpiece-embracing element, the arm swinging from a first position where the element is aligned with the workpiece in the loading position to a second position where the workpiece is in the grinding position supported by the work holder, the loading position of the loading chute, the workpiece-embracing element of the arm when it is in the said first position, and the unloading station of the unloading chute being all aligned along a line parallel to and spaced from the spindle axis, and (f) a plunger operative in a single stroke along the said line to move a workpiece from the loading position into the workpiece-embracing element of the arm at its first position and, at the same time, to move another workpece from the element into the unloading position.

2. A grinding machine as recited in claim 1, wherein the locations of the workpiece in the loading position, in the arm element in the first position of the arm, and in the unloading position are non-coextensive, but adjacent.

3. A grinding machine as recited in claim 1, wherein the loading position is located closest to the housing, the arm first position is next, and the unloading position is outermost, wherein the plunger in performing its functions moves in the direction from the loading position to the unloading position, and wherein the plunger on its return stroke allows a new workpiece to fall from the loading chute into the loading station.

4. A grinding machine as recited in claim 1, wherein the workpiece-embracing element consists of a head with a generally circular aperture in which the workpiece fits loosely and with a groove through which a portion of the work holder extends into the aperture to contact the workpiece when the arm is in the said second position.

5. A grinding machine as recited in claim 4, wherein the head is provided with an opening located at a substantial angle to the said groove to receive another portion of the work holder, the two portions serving to support the workpiece out of contact with the surfaces of the aperture when the arm is in the second position.

6. A grinding machine as recited in claim 1, wherein the plunger consists of a fluid cylinder having a piston rod which serves to drive a first plug which is joined by a rod which is parallel to and spaced from the piston rod to a second plug, the plugs being axially spaced, so that the first plug serves to move an unfinished workpiece axially from the loading station into the workpiece-embracing element and the second plug to move a finished workpiece from the element into the unloading station.

References Cited

UNITED STATES PATENTS

| | | | |
|---|---|---|---|
| 3,226,886 | 1/1966 | Seidel | 51—215 |
| 3,239,969 | 3/1966 | Perry | 51—215 |
| 3,425,169 | 2/1969 | Dunn | 51—215X |

OTHELL M. SIMPSON, Primary Examiner

U.S. Cl. X.R.

82—2.7